Dec. 26, 1933.　　E. W. THOMPSON ET AL　　1,941,118
GUT CLEANING MACHINE
Filed Aug. 4, 1930.　　6 Sheets-Sheet 1

Inventors
Earl W. Thompson
William D. Wollesen
John E. Titus

Dec. 26, 1933.  E. W. THOMPSON ET AL  1,941,118
GUT CLEANING MACHINE
Filed Aug. 4, 1930   6 Sheets-Sheet 2

Inventors
Earl W. Thompson
William D. Wollesen
John E. Titus
By John E. Titus
Atty.

Dec. 26, 1933.  E. W. THOMPSON ET AL  1,941,118
GUT CLEANING MACHINE
Filed Aug. 4, 1930    6 Sheets-Sheet 3
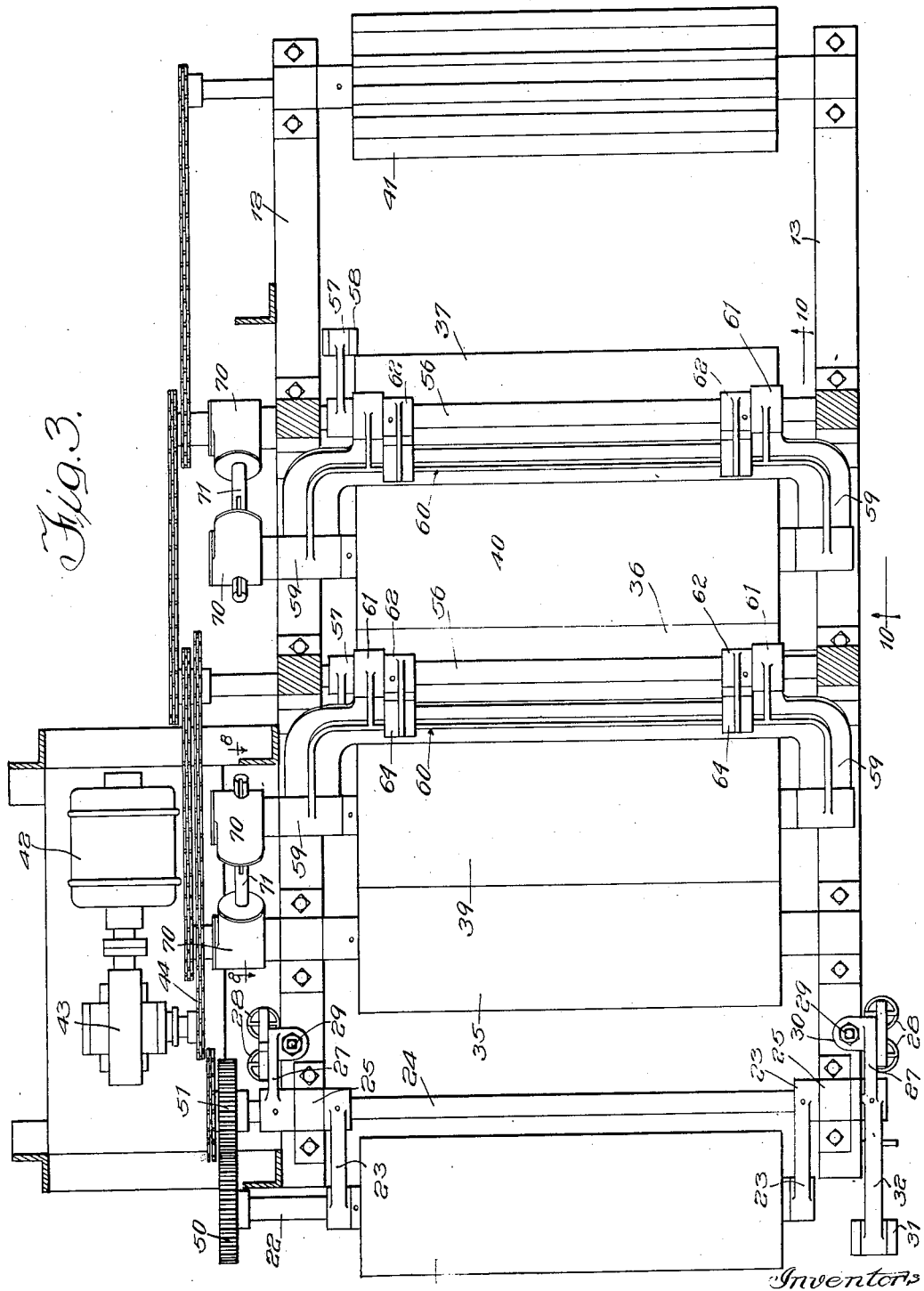
Inventors
Earl W. Thompson
William D. Wolcsen
John E. Titus
By John E. Titus Atty.

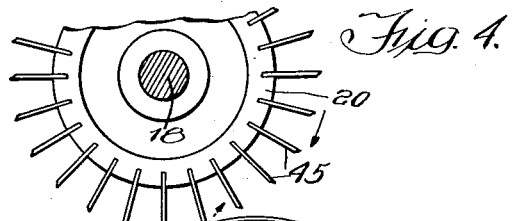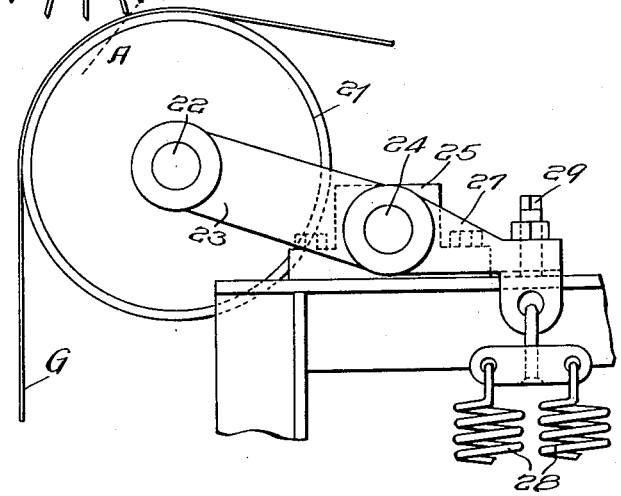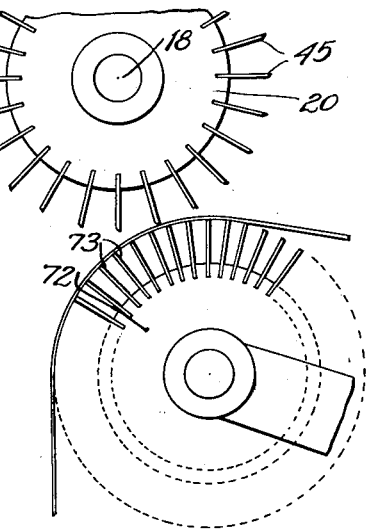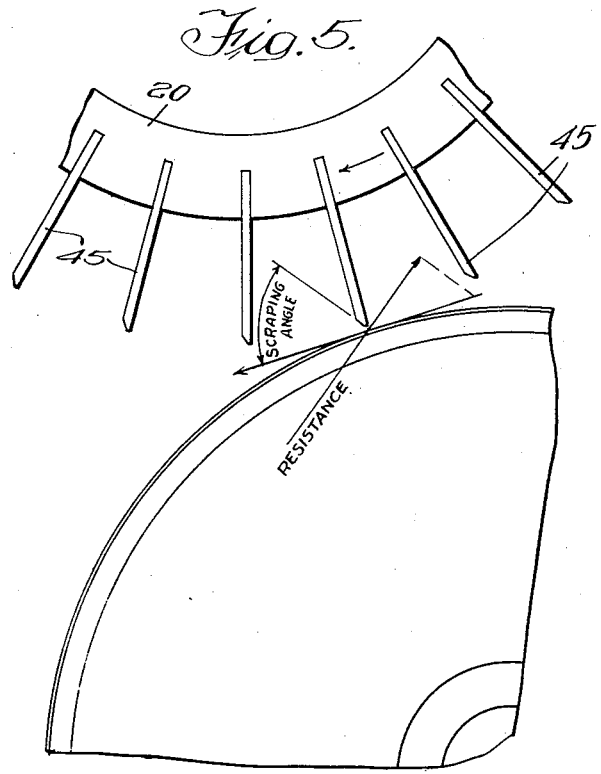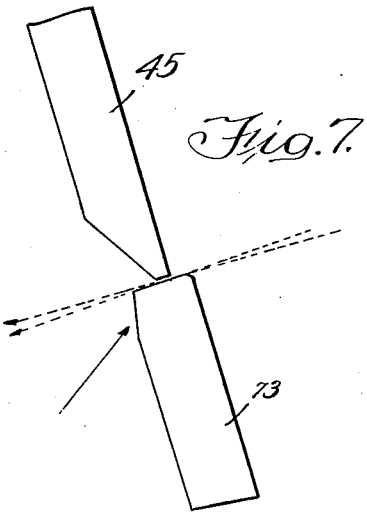

Dec. 26, 1933. E. W. THOMPSON ET AL 1,941,118
GUT CLEANING MACHINE
Filed Aug. 4, 1930   6 Sheets-Sheet 5

Inventors
Earl W. Thompson
William D. Wollesen
John E. Titus

Dec. 26, 1933.   E. W. THOMPSON ET AL   1,941,118
GUT CLEANING MACHINE
Filed Aug. 4, 1930    6 Sheets-Sheet 6

Inventors
Earl W. Thompson
William D. Wollesen
John E. Titus
By John E. Titus
Atty.

Patented Dec. 26, 1933

1,941,118

UNITED STATES PATENT OFFICE 1,941,118

GUT CLEANING MACHINE

Earl W. Thompson, William D. Wollesen, and John E. Titus, Chicago, Ill.; said Wollesen and said Titus assignors to said Thompson Application August 4, 1930. Serial No. 472,860

13 Claims. (Cl. 17—43)

This invention relates to improvements in machines for cleaning gut, or animal intestines, and more especially to the process of removing the mucous membrane, fatty substance and other tissues which are found on the inner side of the casing membrane, the invention being more particularly adapted for cleaning the gut after it has been slit into strips.

Objects of the invention are to provide a machine which will operate in a thorough and efficient manner to remove the tissue and also the growths or scale which may have adhered to the membrane, without breaking or damaging the gut; to provide effective means for pulling the gut through the machine in collections or bunches of strips, and to provide a machine in which the traction on the strips of gut is very positive and the strips are pulled along evenly.

Other objects and advantages will become apparent in the following description, with reference to the accompanying drawings, in which illustrative embodiments of our invention are shown.

In the drawings,—

Fig. 3 is a plan section substantially on the line 3—3 of Fig. 2.

Fig. 4 is a view of the scraping mechanism located at the front of the machine.

Fig. 5 is an enlarged fragmentary detail of parts shown in Fig. 4.

Fig. 6 is a view of a modified form of the scraping mechanism.

Fig. 7 is a diagrammatic view of elements shown in Fig. 6.

The machine has a built-up steel frame 11 having the pair of horizontal bearing support rails 12—13, and the rails 14—15 above the rails 12—13, supported from one side by the cantilever arms 16.

Figure 1:
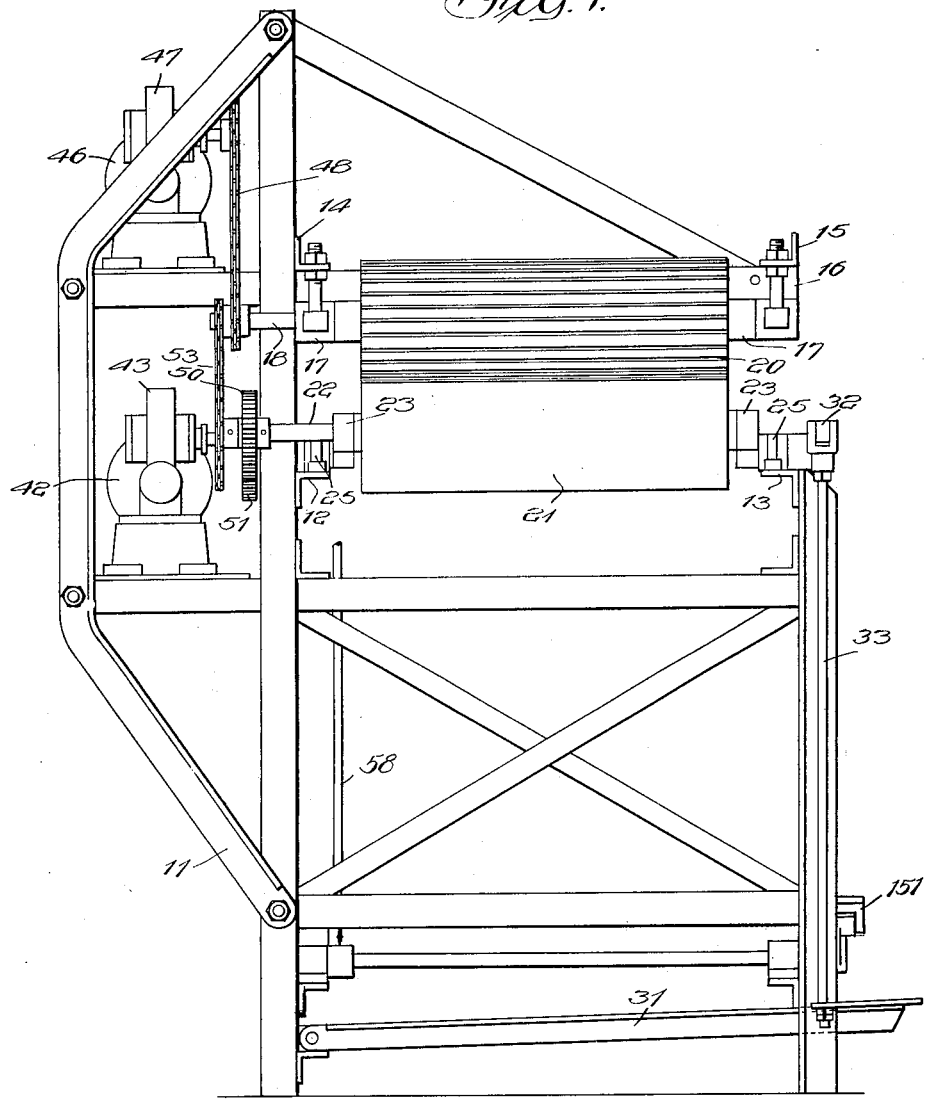
Fig. 1 is a front elevation of the gut cleaning machine.
Figure 2:
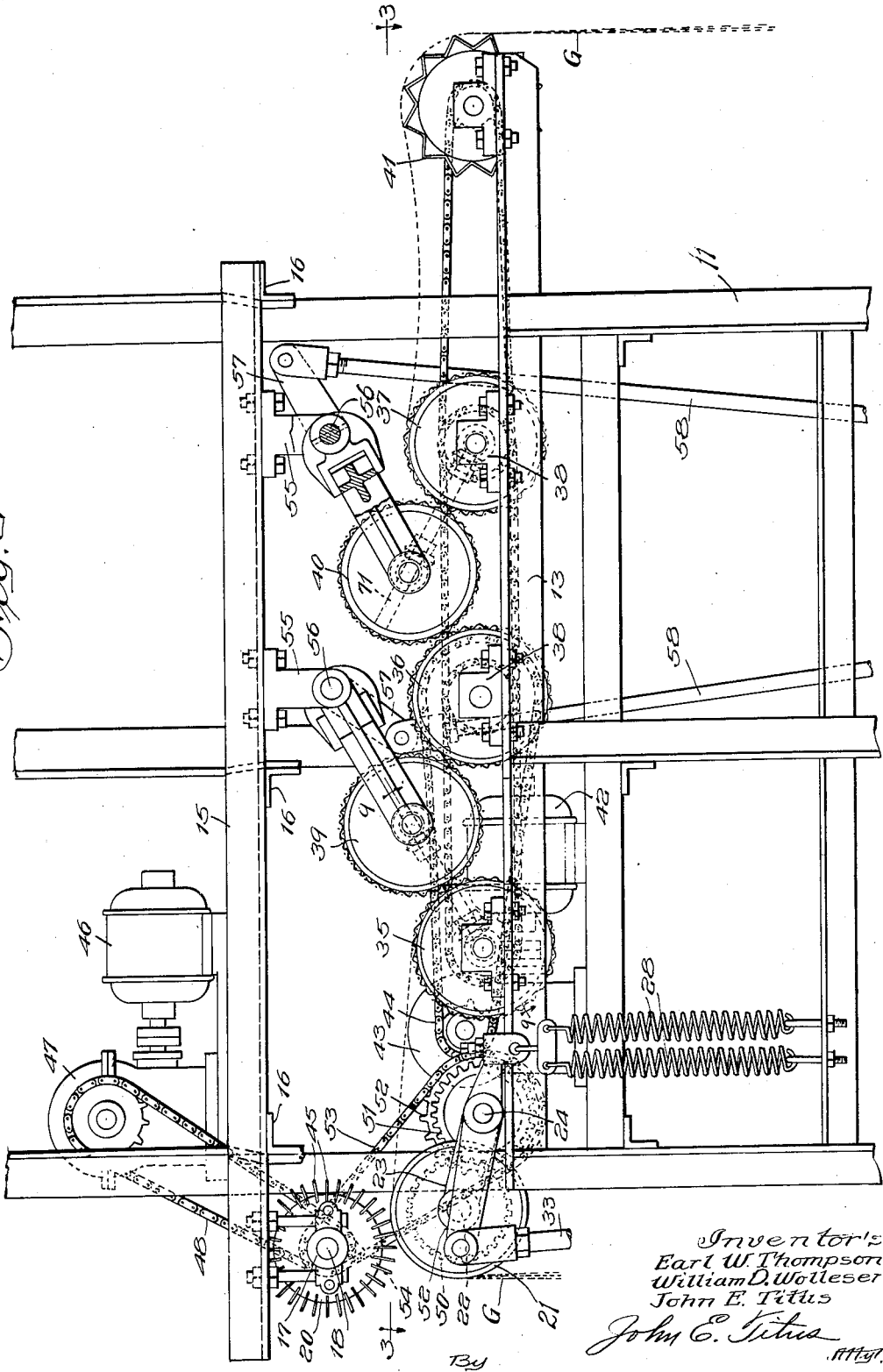
Fig. 2 is a view of the right-hand side of the machine, looking from the front, with the upper and lower portions of the frame broken away.

At the front of the machine, and fixedly supported from the upper rails 14 and 15, are bearing members 17 in which is rotatably mounted the shaft 18 of the bladed scraping cylinder 20. Below the scraping cylinder 20 and offset to the rear is a movable platen roller 21, the shaft 22 of the roller being rotatably mounted in the ends of arms 23 which are fixed on a rock-shaft 24 which is rotatably mounted in bearing members 25 bolted to the rails 12 and 13. Rearwardly projecting arms 27 are pinned to the shaft 24 at each side of the cylinder 21 and at the opposite sides of the bearings 25, to which arms are connected the coil springs 28 which serve to press the platen cylinder towards the cutting cylinder, the lower ends of the springs being attached to the frame, as shown in Fig. 2. For regulating the space between the cylinders, adjustable stops are provided by the set screws 29, which are threaded through laterally projecting portions 30 of the arms 27 and contact with the upper surfaces of the rails 12 and 13.

In this manner the platen roller is resiliently supported to bear against the scraping cylinder in a tangential direction, since the direction or line of pressure between adjacent portions of the two cylinders does not pass through their axes, but to one side, as shown by the arrow A in Figs. 4 and 5. The spacing may be minutely adjusted by the set screws so that the rollers do not actually come in contact, which would result in cutting the gut, but are sufficiently close to scrape off the tissue and other matter.

For inserting the gut strips between the cylinders, the platen cylinder may be moved down away from the scraping blades 45 of the cylinder 20, and against the action of the springs 28 by means of a foot lever 31. The foot lever is mounted on the base of the frame, and it is pivotally connected to the lever 32 by the connecting rod 33, the lever 32 being mounted on and rigidly pinned to the shaft 24.

For drawing the gut G through between the cylinders, the pulling rollers 35, 36, 37 are provided, rotatably mounted on fixed bearings 38, bolted to the rails 12 and 13 and the pressure rollers 39 and 40 which rest on the fixed rollers in the intervals therebetween. On the rear ends of the rails 12 and 13 is rotatably mounted a take-off roller 41. This roller is connected to the roller 37 for driving in the same direction, and is rotated at a higher rate to pull the gut loose from the roller.

The rollers are driven clockwise as viewed in Fig. 4 by the motor 42, mounted on the frame, through the speed reducer 43 and the chain belt 44; and the cylinder 20 is similarly rotated, so that the blades 45, of the cylinder, move against the direction of the travel of the gut, by the motor 46, which is connected through the speed reducer 47 and chain belt 48 to the shaft 18. The speed ratios are such that the cylinder is rotated much faster than the pulling roller, so that a large number, sixty or more, of the blades operate on each inch of length of the gut.

The platen cylinder 21 is rotated counter-clockwise by means of the spur gear 50, keyed on the shaft 22, meshing with a gear 51, rotatably mounted on the rock-shaft 24, to which is fixedly secured a large sprocket wheel 52. The sprocket wheel 52 is connected by a chain belt 53 to the shaft 18 with a large speed reduction, so that the platen cylinder is revolved comparatively slowly. This gives a comparatively stationary support for the gut against the action of the blades and at the same time tends to work the scrapings back away from the cylinders and to distribute the strips evenly in a single layer.

For movably supporting the pressure rollers 39 and 40 so that they may be raised out of engagement with the pulling rollers 35, 36 and 37, two pairs of depending bearing brackets 55 are bolted to the upper rails 14 and 15. Rotatably mounted in each pair of brackets is a rock-shaft 56 to which is secured a lever 57 which is pivotally connected to a suitable foot lever 151 by the rod 58.

On each rock-shaft 56 is loosely mounted a swing frame 60, in the ends of the arms 59 of which are rotatably mounted the pressure rollers. Each swing frame has two projecting portions 61, which are slotted to embrace the rock-shaft 56 to permit transverse movement relative thereto. For causing the swing frame to rotate with the shaft 56, yoke members 62 are pinned to the shaft at the sides of the frame portions 61, which yoke members have arms 64 which embrace the adjoining portion of the frame and restrict the frame to movements transverse to the axis of the shaft.

Figure 8:
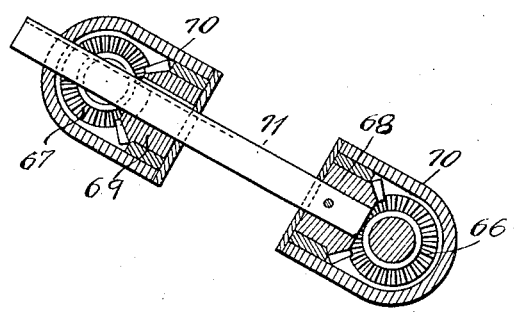
Fig. 8 is a cross section of the extensible driving connection taken on the line 8—8 of Fig. 3.
Figure 9:
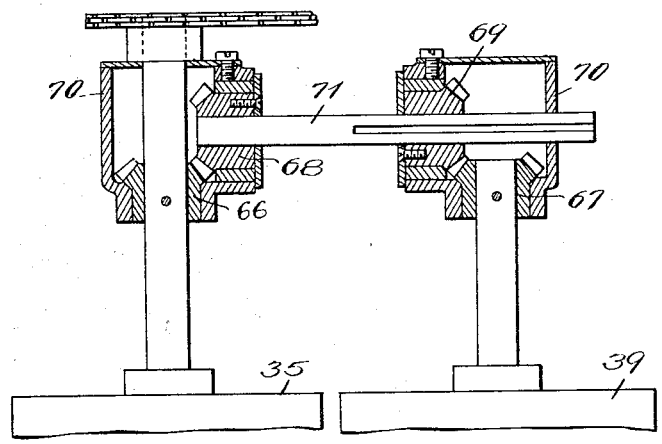
Fig. 9 is a section including the parts shown in Fig. 8, taken on the line 9—9 of Fig. 2.
Figure 10:
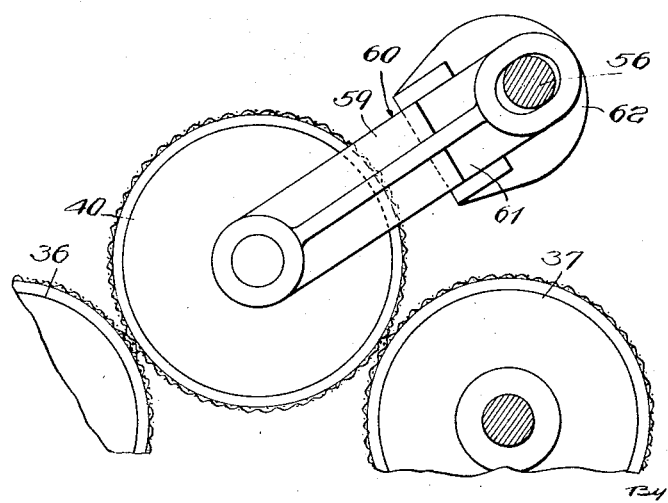
Fig. 10 is a detail section taken on the line 10—10 of Fig. 3.
Figure 11:
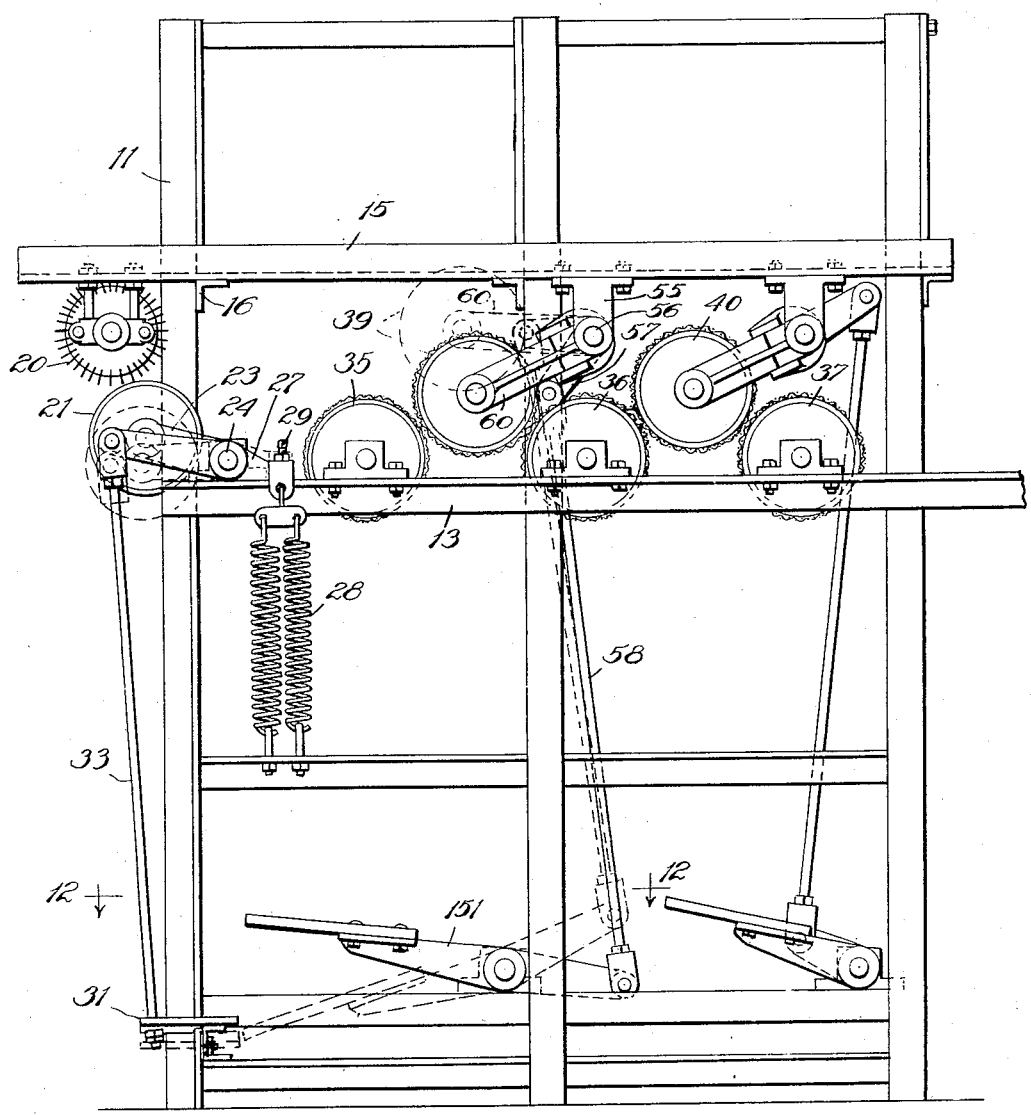
Fig. 11 is a side view of the machine with parts omitted.
Figure 12:
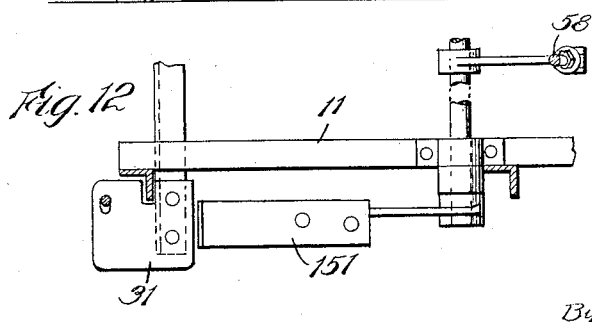
Fig. 12 is a section on line 12—12 of Fig. 11.

The pressure rollers are also positively connected to the lower roller for co-rotational driving by an extensible miter-gear arrangement. This arrangement, for the roller 40, is as follows:

The gears 66 and 67 are, respectively, fixedly mounted on and connected to the rollers 35 and 39 and mesh with gears 68 and 69 rotatably mounted in the housings 70. The housings 70 are revolvably mounted on the hubs of the gears 66 and 67, and the gears 68 and 69 are connected by the shaft 71, which is pinned in one gear 69 and is slidably keyed in the gear 68, as best shown in Fig. 8 and Fig. 9.

In this mounting, described above, the pressure rollers have a limited universal freedom of movement which allows them to rest on both of the lower rollers, but the movement is sufficiently guided and restricted by the yokes 62 that bouncing is prevented. There are four pressure lines of contact between the five rollers, and the length of contact of the gut on the rollers is equivalent to nearly one and one-half the circumference of one roller. The rollers are wrapped with burlap so that a yielding pressure is applied to the gut.

Beveling the leading edges of the cylinder blades 45, as best shown in Fig. 5, has the effect of causing the acute angular contact with the gut which is necessary for scraping the surface without cutting; and the direction of the tangential pressure between the cylinders is never greater than a right angle, as shown in Fig. 5.

For ensuring thorough scraping of both sides of the gut, a bladed platen roller 72 may be provided, as shown in Fig. 6. The roller 72 is also rotated at a slower rate than the upper roller, and has a greater number of blades 73. In operation several of the upper blades 45 sweep over the end of each of the blades 73 as the gut is being drawn between at a comparatively slow rate. However in most instances blades are provided on only one of the scraping rolls, and the other, or platen roll is allowed to idle.

The matter of facilitating the insertion and handling the gut becomes of considerable importance in the operation of the machine on account of the frequency of the insertion of new batches of strips. For convenience in handling, a number of strips are tied together at one end in batches, and the strips are scraped back for about one yard from the end to avoid the danger of injury to the operator if he had to take hold of the strips too close to the scraping blades.

The cooperating scraping and pulling rollers are separated, and the gut is laid over the platen which is then released to start scraping, the tied ends of the strips being pulled along over the pulling rollers and the take-off roller and the pressure rollers lowered as the end passes under.

The provision of the C shaped frame, as shown and described, with the mutually cooperating members mounted respectively on the upper and lower portions of the frame leaves the space between the members, when separated, entirely unobstructed for the insertion of the gut. The gut is straightened out and held in the hands with the arms spread apart, and is passed directly into the machine and laid on the lower members, and it is not necessary to loosen the hold on the gut nor to pass the gut from one hand to the other as is required in the prior machines to get around supports or to wrap the gut around rollers.

The foot lever 151 is extended into close relation with the foot lever 31 to enable the operator at the front of the machine to step on both of the levers at the same time. The operator at the front of the machine steps on both levers to lower the platen and raise the first pulling pressure roller and lays in the gut with a hand at either side of the scraping roller. He then moves his foot over and off from the lever 31 to release the platen to start scraping. Then he pulls the gut along and passes it to the operator at the rear of the machine who has raised the second pressure roller. The first operator lets the first pressure roller down as the gut passes under and returns to the front of the machine where he is kept busy straightening out the gut and working off the refuse with his hands. Meanwhile the second operator carries the end along, lowering the second pressure roller, and out over the take-off roller where he stands and keeps a slight tension on the gut and watches to see that broken strips do not become wrapped around the rollers. By this arrangement it is not necessary to start and stop the machine each time a new batch is started through, and the power for starting the machine is saved.

While but one illustrative embodiment and a single modification of our invention has been shown and described, many omissions and alterations may be had without departing from the spirit of the invention, as defined in the following claims.

What is claimed is:

1. In a gut cleaning machine, means for pulling the gut through the machine, comprising two parallel rollers in spaced relation, a pressure roller mounted on pivotally supported bearings to swing into contact with said rollers, the pivotal mounting being loose so that the pressure roller is free to shift so as to bear against both of said rollers, and means for driving the rollers.

2. The combination, in a gut cleaning machine, of a frame, two pulling rollers rotatably mounted on the frame in parallel and spaced relation, a rock-shaft rotatably mounted on the frame above the two rollers, a swinging frame loosely connected to the rock-shaft, a pressure roller rotatably mounted in the swinging frame to rest on the two pulling rollers, a yoke fixed to the rock-shaft and embracing the swing frame, and means for driving the rollers.

3. The combination in a gut cleaning machine of a frame, two gut pulling rollers rotatably mounted on the frame, a rock-shaft rotatably mounted in the frame, a swing frame transversely slidable on the rock-shaft, a pressure roller rotatably mounted in the swing frame to bear against the two rollers, means for driving the rollers in co-operative relation, and means for rotating the rock-shaft to move the pressure roller into and out of engagement.

4. In a gut cleaning machine, two pulling rollers and a pressure roller resting on both of the pulling rollers, means for raising and lowering the pressure roller, means for rotating the two pulling rollers in the same direction, and an extensible connection from one of the pulling rollers for rotating the pressure roller in co-operative relation therewith, said connection comprising a telescoping shaft and bevel gears for connecting the shaft to the one pulling roller and to the pressure roller.

5. In a gut cleaning machine, a bladed scraping cylinder and a movable platen cylinder co-operating therewith, three pulling rollers for drawing the gut through between said cylinders, two pressure rollers movably mounted to rest on the pulling rollers respectively in the intervals therebetween, a corrugated roller for pulling the gut from the pulling rollers, means for rotating the cylinders and the rollers, and manually-operable means for disengaging the platen cylinder and the pressure rollers for the insertion of the gut.

6. In a gut cleaning machine, a bladed scraping cylinder and a co-operative platen, means for drawing the gut through between the cylinder and platen and for kneading the gut, comprising two spaced pulling rollers and a pressure roller resting on both of the pulling rollers in the interval therebetween, and means for rotating the cylinder and all three rollers.

7. In a gut cleaning machine, a scraping roller having a plurality of closely spaced resilient longitudinal blades and constantly rotated in fixed bearings, a rock-shaft mounted parallel to the scraping roller for rotational movement, spaced arms fixed on the rock-shaft, a platen roller rotatably mounted in the outer ends of the arms, resilient means for rotating the rock-shaft to move the platen roller against the scraping roller, and adjustable stops associated with the arms for regulating the space between the rollers.

8. In a gut cleaning machine, a C frame, scraping means mounted on the upper and lower portions of the frame, said means being in cooperative relation for scraping the gut, pulling rollers mounted on the lower portion of the frame, and pressure rollers movably mounted on the upper portion of the frame, the pressure rollers being mounted so as to rest on both of the pulling rollers by gravity and mounted so that the spaces between the pressure rollers and the pulling rollers are unobstructed for the insertion of the gut.

9. In a gut cleaning machine, a C frame, a platen, pulling rollers, and a take-off roller mounted on the lower portion of the frame in the order mentioned, a scraping roller cooperating with the platen and movably supported pressure rollers resting on the pulling rollers, the scraping roller and the pressure rollers being supported in the upper portion of the frame so that the space therein when the pressure rollers are raised is unobstructed for the insertion of the gut.

10. In a gut cleaning machine, a C frame, a platen and three pulling rollers consecutively mounted on the lower portion of the frame, a scraping roller mounted in the upper portion of the frame for cooperating with the platen, and two yokes pivotally mounted in said upper portion, a pressure roller rotatably mounted in the arms of each yoke, the yokes being arranged so that one pressure roller rests on the pulling rollers in each interval therebetween, means for lowering the platen, means for raising the first pressure roller related with said means so that it may be operated in conjunction therewith, and independent means for raising the second pressure roller, so that the second pressure roller may be left down for pulling the last end of the gut through the machine while the platen is lowered and the first pressure roller is lifted to insert the first end of a new length of gut, the rollers being rotated continuously.

11. In a gut cleaning machine, a C frame, means mounted on the frame for scraping the gut, and means for pulling the gut through said means comprising two spaced driven rollers mounted on the lower portion of the frame, a yoke loosely pivoted to the upper portion of the frame, a pressure roller journaled in the arms of the yoke for resting on both of the pulling rollers in the interval therebetween, and means for rotating the yoke for lifting the pressure roller out of engagement with the pulling rollers.

12. In a gut cleaning machine, a C frame, separable cooperative means mounted respectively on the upper and lower portions of the frame for cleaning the gut, two spaced pulling rollers mounted on the lower portion of the frame, a pressure roller swingingly mounted on the upper portion of the machine to rest on both of the pulling rollers, a foot lever for separating the scraping means when pressed, and a foot lever for lifting the pressure roller, said levers being in close positional relation for simultaneous operation with one foot, the scraping means and the pressure and pulling rollers being mounted so that the spaces therebetween are unobstructed for the insertion of the gut.

13. In a gut cleaning machine, a C frame, a platen and three spaced pulling rollers rotatably mounted on the lower portion of the frame for pulling the gut over the platen, yokes pivotally mounted in the upper portion of the frame, a pressure roller journaled in the arms of each yoke to rest on the pulling rollers in the intervals therebetween, a foot lever for lowering the platen, a foot lever for raising the first pressure roller associated with said lever so that the platen and the first pressure roller may be raised simultaneously, and a separate lever for raising the second pressure roller.

EARL W. THOMPSON.
WILLIAM D. WOLLESEN.
JOHN E. TITUS.